United States Patent
Staeber et al.

(10) Patent No.: US 7,963,705 B2
(45) Date of Patent: Jun. 21, 2011

(54) MOLDED INTERCONNECT DEVICE (MID) OPTICAL CONNECTOR WITH METAL RETAINING CLIP

(75) Inventors: Tobias Staeber, Regensburg (DE); Thomas Lichtenegger, Alteglofsheim (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 12/391,341

(22) Filed: Feb. 24, 2009

(65) Prior Publication Data

US 2010/0215320 A1 Aug. 26, 2010

(51) Int. Cl.
 *G02B 6/36* (2006.01)
(52) U.S. Cl. .......................................... 385/92; 385/88
(58) Field of Classification Search .................. None
 See application file for complete search history.

(56) References Cited

U.S. PATENT DOCUMENTS

| | | | | |
|---|---|---|---|---|
| 4,547,039 A | * | 10/1985 | Caron et al. | 385/88 |
| 5,337,396 A | * | 8/1994 | Chen et al. | 385/92 |
| 5,774,614 A | * | 6/1998 | Gilliland et al. | 385/88 |
| 5,933,558 A | * | 8/1999 | Sauvageau et al. | 385/88 |
| 6,048,106 A | * | 4/2000 | Iwase | 385/88 |
| 6,511,233 B1 | * | 1/2003 | Steijer et al. | 385/88 |
| 6,517,258 B1 | * | 2/2003 | Keska et al. | 385/92 |
| 7,712,979 B2 | * | 5/2010 | Shibata et al. | 385/92 |
| 2007/0217734 A1 | * | 9/2007 | Auburger et al. | 385/15 |

FOREIGN PATENT DOCUMENTS

JP 2001332152 A 11/2001

* cited by examiner

*Primary Examiner* — Rhonda S Peace

(57) ABSTRACT

A molded interconnect device (MID) optical connector includes a molded plastic body and a metal retaining clip. The body has a receptacle portion shaped to receive and guide a mating optical fiber ferrule into a connected position. In the connected position, the end of a fiber retained in the ferrule is in optical alignment with an opto-electronic device in the MID optical connector. The retaining clip has one or more contact portions that extend into the receptacle portion of the body and exert a spring force upon the ferrule to retain and stabilize it in the connected position.

10 Claims, 4 Drawing Sheets

MOLDED INTERCONNECT DEVICE (MID) OPTICAL CONNECTOR WITH METAL RETAINING CLIP

BACKGROUND

In an optical communication system, it is typically necessary to couple an optical fiber to a transmitter, receiver or transceiver device. Such a device typically includes an optical connector for this purpose. An optical cable comprising a fiber terminating in a ferrule can be coupled to the optical connector by plugging the ferrule into the connector. The connector typically includes an opto-electronic device, such as a light source or light sensor, a receptacle portion that guides the ferrule into a position in which it is optically aligned with the opto-electronic device, and a retaining mechanism that inhibits inadvertent removal, i.e., unplugging, of the ferrule from the receptacle portion.

The term "molded interconnect device" or "MID" technology refers to the integration of mechanical and electrical interconnection features into a unitary device. A device or part that employs MID technology is typically referred to as an MID device or MID part. An MID device typically combines electrical features with a housing, frame or other body made of molded plastic material. The electrical features typically include metallized areas on or in the body that can be formed economically by, for example, chemical deposition processes. An MID device can comprise, for example, a molded plastic body, (metal) circuit traces or other electrical interconnects, solder pads for mounting integrated circuit chips, and other electrical features that are formed on or in the body. Employing MID technology promotes device miniaturization by using metallized areas on or in the device housing instead of printed circuit boards and other electrical interconnects that, in accordance with earlier technology, would typically be mounted in the device housing along with other elements.

SUMMARY

Embodiments of the present invention relate to a molded interconnect device (MID) optical connector that includes a body made of a plastic material and a retaining clip made of metal. As an MID, the optical connector characteristically includes electrical elements integrally formed with mechanical elements. In exemplary embodiments, electrical elements include circuit traces and other electrical interconnects formed on or in the body. The body has a receptacle portion shaped to receive and guide a mating optical fiber ferrule in a direction of an axis into a connected position. In the connected position, the end of a fiber that is retained in the ferrule is in optical alignment with the opto-electronic device along the axis.

The retaining clip is attached to the body and has one or more contact portions that extend into the receptacle portion of the body. In this position, the retaining clip exerts a spring force upon a portion of the ferrule when the ferrule is in the connected position.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 5:
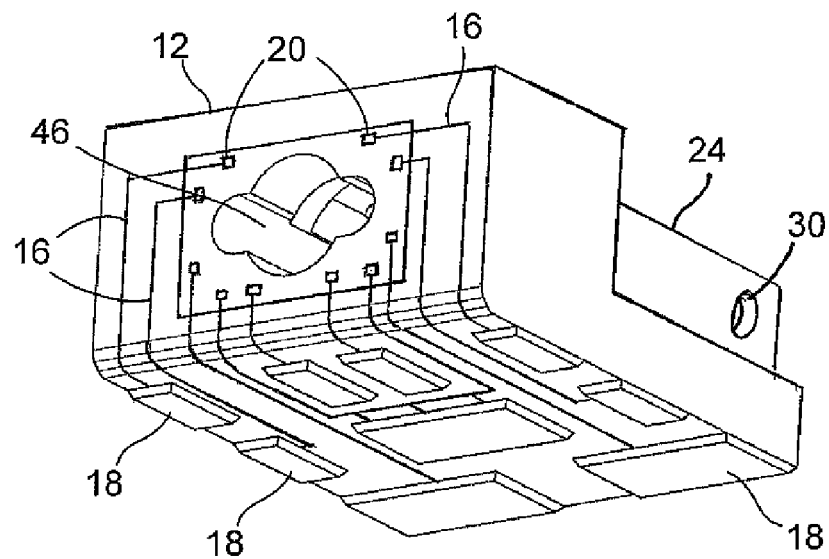
FIG. 5 is a perspective view showing the bottom and rear sides of the MID optical connector of FIG. 1.
Figure 6:
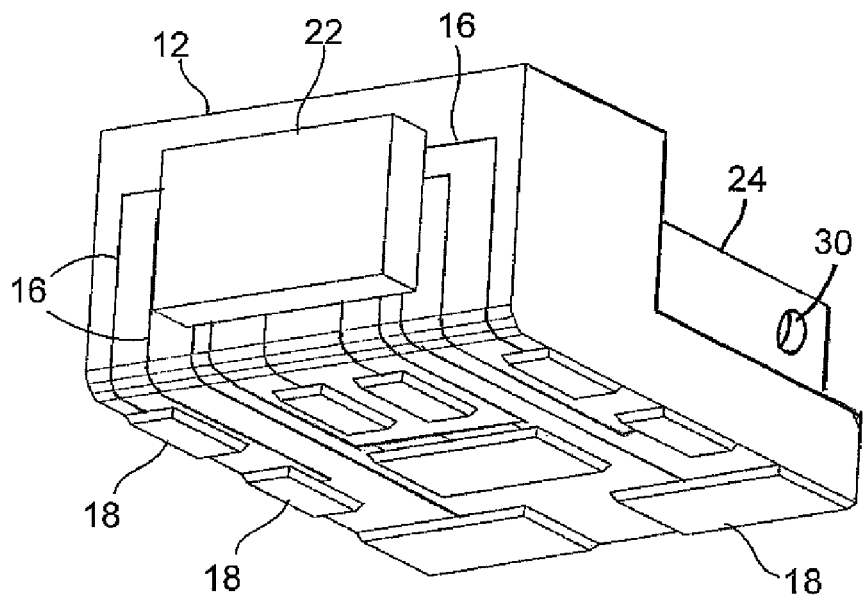
FIG. 6 is similar to FIG. 5, showing the opto-electronic chip mounted on the rear side of the optical connector.

As illustrated in FIGS. 1-4, in an exemplary embodiment of the invention, a molded interconnect device (MID) optical connector 10 includes a generally L-shaped body 12 and a generally U-shaped retaining clip 14. For reasons described below, body 12 is made of a plastic material, while retaining clip 14 is made of metal. In accordance with MID technology, MID optical connector 10 is characterized by having both electrical and mechanical features integrated together in a single device. Referring briefly to FIGS. 5-6, in the exemplary embodiment such electrical features include metallized interconnect areas 16 and electrical contacts 18 on a bottom side of body 12 that defines one leg of the "L" shape of body 12, as well as additional metallized interconnect areas 16, solder pads 20, and an opto-electronic device 22, such as a photodetector or laser chip, on a rear side of body 12 that defines the other leg of the "L" shape of body 12.

Although in the exemplary embodiment body 12 is L-shaped and has electrical elements mounted on bottom and rear sides, in other embodiments such a body can have any other suitable shape and have electrical elements arranged on or in the body in any other suitable manner. As used in this patent specification ("herein"), the terms "in," "on" and variants such as "therein" and "thereon" are used synonymously with each other, and reference to a first element being "on" a second element includes within its scope of meaning the first element being "in" the second element, and vice versa.

Returning to FIGS. 1-2, retaining clip 14 is attached to body 10 by virtue of a base portion of retaining clip 14 being seated within a channel 23 in body 10. Retaining clip 14 can be secured in channel 22 by a friction fit. In other embodiments of the invention, such a retaining clip can be attached to and secured to such a body in any other suitable manner, such as by molding the retaining clip into the body, securing the two parts together with plastic rivets or other fasteners, flexing the retaining clip into a resilient, i.e., spring, fit with a mating portion of the body, engaging teeth or other protuberances formed in the retaining clip into a wall or other portion of the body, etc.

The "U" shape of retaining clip 14 is defined by the two finger portions 24 and 26 in combination with the base portion 28 that interconnects finger portions 24 and 26. Each of finger portions 24 and 26 has a respective hole 30 and 32, so as to provide a recess in the inwardly facing wall of finger portion 24 or 26, respectively. The function of these recesses is described below. Although in this exemplary embodiment of the invention retaining clip 14 is U-shaped, in other embodiments such a retaining clip can have any other suitable shape that provides the retaining and stabilizing functions described below.

Figure 1:
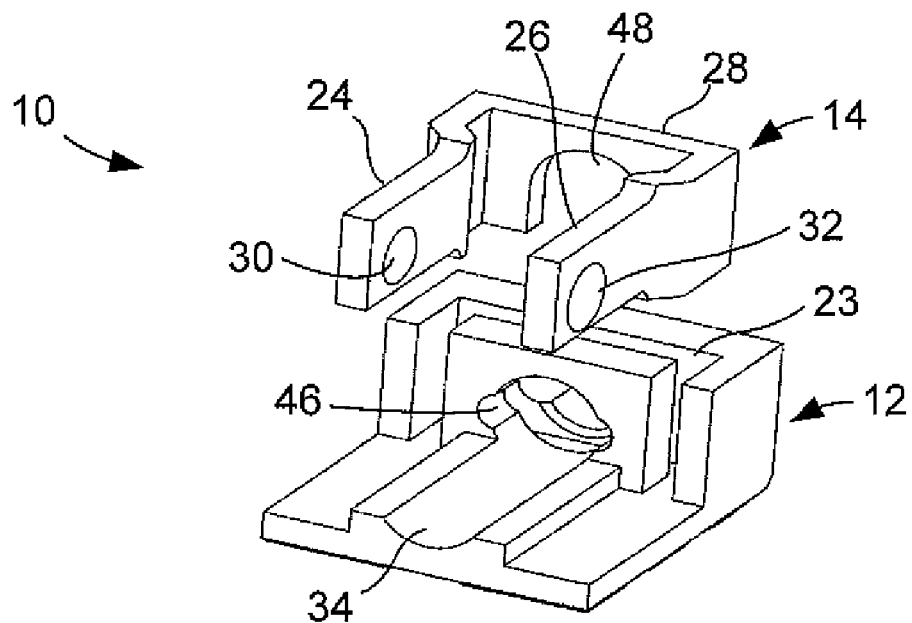
FIG. 1 is an exploded perspective view of an MID optical connector in accordance with an exemplary embodiment of the invention, showing the metal clip separated from the optical connector body.
Figure 2:
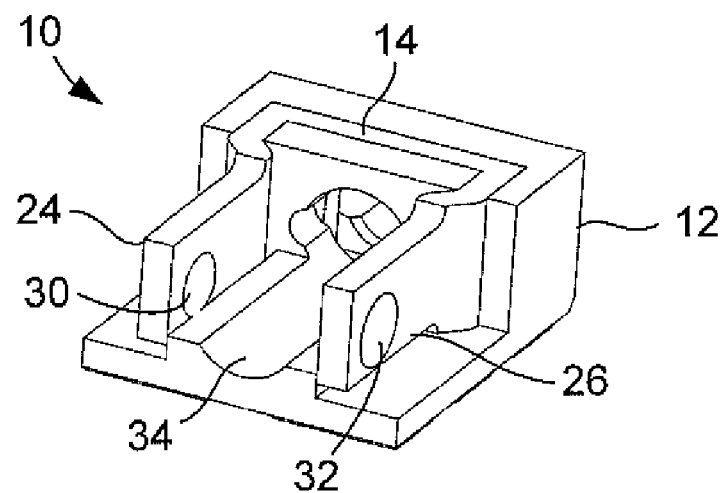
FIG. 2 is similar to FIG. 1, showing the metal clip in place in the optical connector body.
Figure 3:
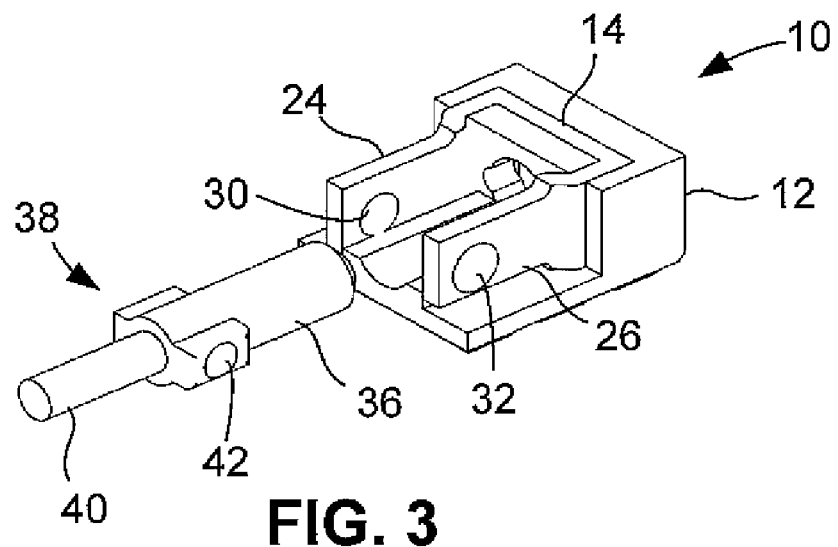
FIG. 3 is a perspective view showing the MID optical connector of FIG. 1 mating with an optical cable.
Figure 4:
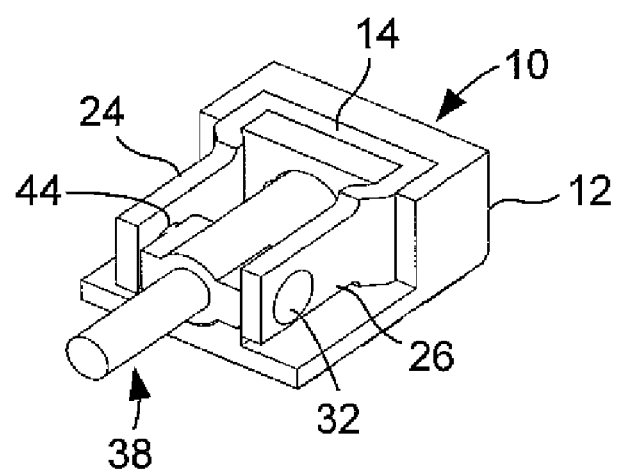
FIG. 4 is similar to FIG. 3, showing the MID optical connector and the optical cable in a mated or connected position.

Body 12 has a receptacle portion 34 with a semi-cylindrical wall that promotes receiving and guiding a correspondingly cylindrical ferrule 36 into a connected position, as illustrated in FIGS. 3-4. An optical cable 38, comprising an optical fiber 40 retained in ferrule 36, can be connected to MID optical connector 10 by plugging ferrule 36 into receptacle portion 34 until ferrule 36 reaches a connected position in which optical fiber 40 is axially (and thus optically) aligned with an optical axis of opto-electronic device 22 (see FIGS. 5-6). As ferrule 36 is plugged into receptacle portion 34 (in a direction substantially along the optical axis of opto-electronic device 22), the semi-cylindrical wall of receptacle portion 34 helps to guide ferrule 36. As ferrule 36 is moved further into receptacle portion 34, protuberances 42 and 44 on ferrule 36 resiliently flex, i.e., spread apart, finger portions 24 and 26 of retaining clip 14. When ferrule 36 is moved to the extent that protuberances 42 and 44 engage the recesses defined by holes 30 and 32, the flexed finger portions 24 and 26 resiliently return substantially to their unflexed state. In this state, the spring force exerted by finger portions 24 and 26 upon ferrule 36 helps to hold and stabilize ferrule 36 with respect to body 12. Held together and stabilized in this manner, ferrule 36 and MID optical connector 10 resist inadvertent disconnection from one another as well as relative movement between each other as a result of, for example, vibration, flexure of optical cable 38, etc. Stability in the connected position, where the end of optical fiber 40 retained in ferrule 36 is axially aligned with opto-electronic device 22, promotes good optical coupling between the optical fiber end and opto-electronic device 22. Note that an opening 46 in the rear side of body 12 and an opening 48 in base portion 28 of retaining clip 14 are axially aligned with opto-electronic device 22, thereby providing an unobstructed path for optical coupling between the optical fiber end and opto-electronic device 22.

In addition, base portion 28 of retaining clip 14, which is disposed in an orientation perpendicular to the optical axis of opto-electronic device 22, helps to shield opto-electronic device 22 and any other electronic elements on the rear side or region of body 12 against entry of electromagnetic interference (EMI) from the receptacle side or region of body 12.

Optical cable 38 can be disconnected from MID optical connector 10 by unplugging or pulling ferrule 36 from receptacle portion 34. Pulling ferrule 36 from receptacle 34 with an initial force sufficient to overcome the above-described spring force disengages protuberances 42 and 44 from the recesses in finger portions 24 and 26. Once disengaged in this manner, ferrule 36 can easily be withdrawn from receptacle 34.

It should be understood that elements not directly relating to the structure and use of MID optical connector 10 are not shown for purposes of clarity. As should be apparent to persons skilled in the art to which the invention relates, MID optical connector 10 can be combined with other elements or included as part of another device. For example, MID optical connector 10 can be enclosed within a housing, or can form a portion of a housing when attached to other housing elements.

Figure 7:
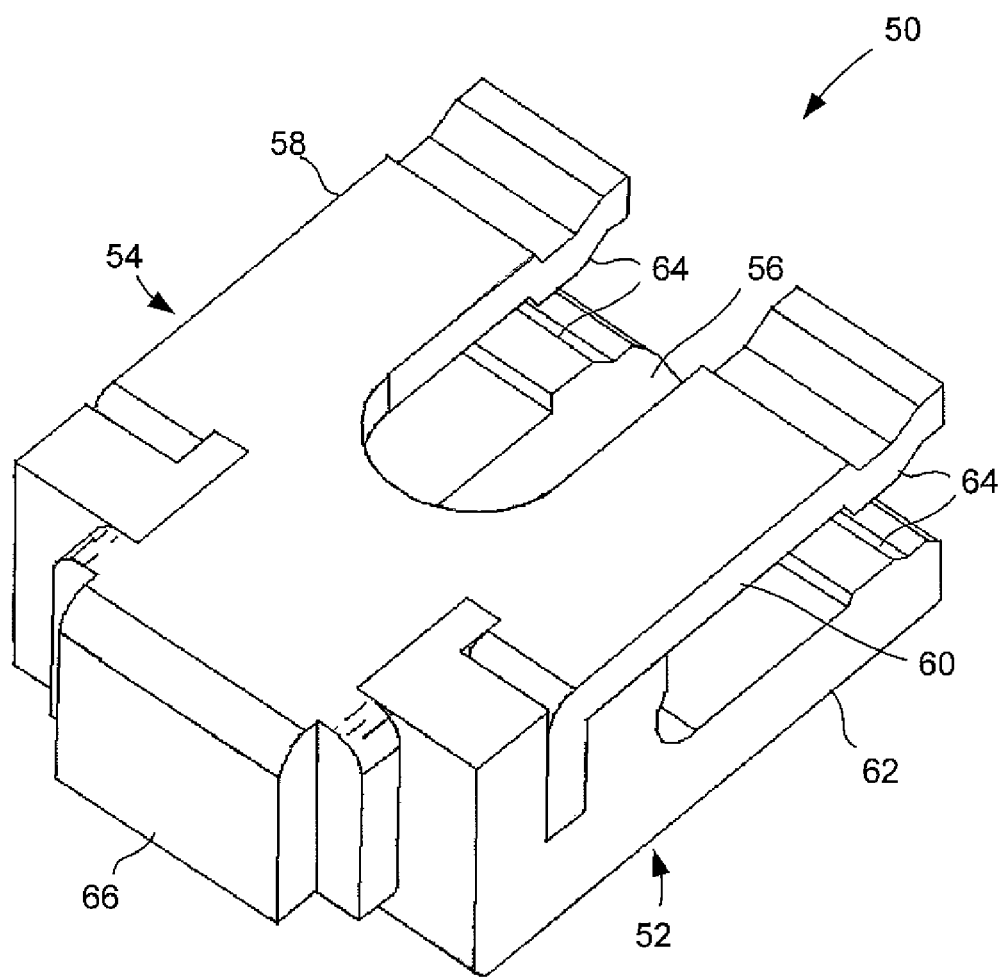
FIG. 7 is a perspective view showing the top of an MID optical connector in accordance with an alternative embodiment of the invention.

As illustrated in FIG. 7, in another exemplary embodiment of the invention, a molded interconnect device (MID) optical connector 50 includes a generally L-shaped body 52 made of molded plastic and a metal retaining clip 54. Retaining clip 54 is attached to body 52 in a manner similar to that described above with regard to the embodiment illustrated in FIGS. 1-6. Body 52 has a receptacle portion 56 that can receive and guide the plug or ferrule portion of an optical cable (not shown) in a manner similar to that described above. Although not visible in the perspective view of FIG. 7, retaining clip 54 includes finger portions adjacent to receptacle portion 56 that flex resiliently in the manner described above to provide the retaining and stabilizing functions described above. In this embodiment, two upper portions 58 and 60 of retaining clip 54 in combination with the lower side or leg 62 of body 52 form a housing-like structure that can receive and retain an optical cable plug. For example, ridge-like features 64 formed on the distal ends of upper portions 58 and 60 and leg 62 can engage mating features formed on the optical cable plug in a snap engagement.

As the upper portions 58 and 60 and associated portions of retaining clip 54 cover a substantial area of MID optical connector 50 that defines a surface of the housing-like structure, they can promote EMI shielding of elements within the housing (not shown). In addition, a rear portion 66 of retaining clip 54 can cover an opto-electronic device similar to that described above with regard to FIG. 6 to shield the opto-electronic device against EMI.

One or more illustrative embodiments of the invention have been described above. However, it is to be understood that the invention is defined by the appended claims and is not limited to the specific embodiments described.

What is claimed is:

1. A molded interconnect device (MID) optical connector, comprising:
   a plurality of electrical elements including an opto-electronic device and conductive interconnect elements;
   a body made of a plastic material, the body further having a portion of the electrical elements formed therein, the body having a receptacle portion shaped to receive and guide a mating optical fiber ferrule in a direction of an axis into a connected position in which a fiber end retained in the ferrule is in optical alignment with the opto-electronic device along the axis, wherein a portion of the conductive interconnect elements that are electrically connected to the opto-electronic device are formed in the body and comprise metalized areas on a surface of the body; and
   a retaining clip made of metal, the retaining clip attached to the body and having one or more contact portions extending into the receptacle to exert a spring force upon a portion of the ferrule in the connected position.

2. The MID optical connector claimed in claim 1, wherein one of the optical fiber ferrule and the contact portion of the retaining clip has a recess, and the other of the optical fiber ferrule and the contact portion of the retaining clip has a protuberance that mates with the recess in the connected position.

3. The MID optical connector claimed in claim 1, wherein the retaining clip is generally U-shaped with finger portions of the "U" defining the contact portions.

4. The MID optical connector claimed in claim 1, wherein:
   the body is generally L-shaped with an "L" defined by two legs;
   the body has electrical elements disposed on the two legs;
   a first one of the legs has a wall aligned with the axis to receive and guide the optical fiber ferrule into the connected position; and
   a second one of the legs has an opening aligned with the axis.

5. The MID optical connector claimed in claim 4, wherein the electrical elements disposed on the first one of the legs include electrical contact pads.

6. The MID optical connector claimed in claim 5, wherein:
the opto-electronic device is mounted on the wall aligned with the axis and adjacent the opening;
a portion of the conductive interconnect elements that are electrically connected to the opto-electronic device comprise metalized areas that follow a corner of the "L" by extending between a surface of the first one of the legs to a surface of the second one of the legs to electrically interconnect the opto-electronic device and the electrical contact pads.

7. The MID optical connector claimed in claim 1, wherein the body has a channel, and the retaining clip is attached to the body by being disposed at least partly in the channel.

8. The MID optical connector claimed in claim 1, wherein a portion of the retaining clip intersects the axis and shields a region in which the opto-electronic device is disposed against electromagnetic interference (EMI).

9. The MID optical connector claimed in claim 1, wherein a portion of the retaining clip covers a surface defining a portion of a housing structure to shield a region inside the housing structure against EMI.

10. The MID optical connector claimed in claim 1, wherein:
the body is generally L-shaped with an "L" defined by two legs; and
at least one metalized area follows a corner of the "L" by extending between a surface of a first one of the legs to a surface of a second one of the legs.

* * * * *